United States Patent
Bure et al.

(10) Patent No.: US 6,882,907 B2
(45) Date of Patent: Apr. 19, 2005

(54) TRACKING UNIT SIGNAL FILTER

(75) Inventors: Rudolf A Bure, Banbury (GB); Philip Hutchings, Calne (GB)

(73) Assignee: TMC Consultants LTD, Banbury (GB)

( * ) Notice: Subject to any disclaimer, the term of this patent is extended or adjusted under 35 U.S.C. 154(b) by 21 days.

(21) Appl. No.: 10/312,753

(22) PCT Filed: Jun. 28, 2001

(86) PCT No.: PCT/GB01/02869
§ 371 (c)(1),
(2), (4) Date: Apr. 9, 2003

(87) PCT Pub. No.: WO02/03095
PCT Pub. Date: Jan. 10, 2002

(65) Prior Publication Data
US 2003/0187551 A1 Oct. 2, 2003

(30) Foreign Application Priority Data
Jul. 4, 2000 (GB) .............................................. 0016280

(51) Int. Cl.[7] ................................................ G06F 7/00
(52) U.S. Cl. ......................................................... 701/1
(58) Field of Search ........................ 701/1, 22; 307/9.1, 307/10.1, 10.6, 44–46

(56) References Cited

U.S. PATENT DOCUMENTS

| | | | | |
|---|---|---|---|---|
| 5,728,933 A | * | 3/1998 | Schultz et al. ............. | 73/146.5 |
| 5,739,592 A | * | 4/1998 | Rigsby et al. ............... | 307/9.1 |
| 5,894,473 A | * | 4/1999 | Dent .......................... | 370/342 |
| 6,111,768 A | * | 8/2000 | Curtiss ........................ | 363/98 |

* cited by examiner

*Primary Examiner*—Yonel Beaulieu
(74) *Attorney, Agent, or Firm*—Paul E Milliken; Ray L Weber

(57) ABSTRACT

A tracking unit signal filter 10 for a vehicle, typically tractor/trailer combinations, having at least one signal input 15–17 for receiving a respective signal A, B or C indicative of a respective vehicle parameter eg. signal C for sensing tractor/trailer coupling, and processor means 28 operable to pass the signal C after a predetermined time delay TC, if said signal is stable, and which is also operable to maintain said stable signal C if the signal is interrupted for less than a predetermined time interval tc.

11 Claims, 3 Drawing Sheets

TRACKING UNIT SIGNAL FILTER

FIELD

This invention relates to a tracking unit signal filter which is used to prevent spurious reports from tracking units which are utilised for locating and tracing vehicles, and vehicle trailers or semi-trailers.

BACKGROUND OF THE INVENTION

For logistical and security reasons there is an increasing interest for transport operators to equip vehicle trailers and semi-trailers with tracking units. These units typically comprise a GPS (Global Positioning Satellite system) receiver to provide location information and other vehicle parameter sensors and may be passive systems which log data for later retrieval, or may be active systems which include a cellular or satellite transmitter/receiver for transmission of data to a monitoring station for continual monitoring of the vehicle.

The transmitters can be programmed to provide location data at desired time intervals or may be programmed to react to particular events such as coupling and decoupling tractor units to a trailer, or opening and closing trailer doors.

Trailer units typically have no source of electrical power and when attached to a tractor the trailer electrical system is connected into the tractor electrical system which supplies a 24v dc electricity to the trailer through ISO standard connectors. When tracking units are fitted to trailers they often have their own 12v battery and a battery charger unit which can recharge the battery from the trailer electrical system during the time period that the tractor and trailer are interconnected.

It is known to use the voltage from the tractor electrical supply (24v) as a signal to monitor the operation status of the trailer i.e coupled or uncoupled in relation to a tractor.

However problems can arise due to the incorrect or incomplete coupling between the tractor and trailer so that for example the trailer electrical system did not receive continuous power but was for example coupled to the power supply only when the brakes are applied or indicators used. Even when correctly connected a continuous power supply may be interrupted due to loose contacts when driving over rough roads.

The tracking unit may operate in response to other vehicle sensed parameters and on-board sensors may be triggered by operational conditions, for example door condition sensors may be triggered by driving over bumpy roads, or by shocks caused by fork lift trucks during loading or unloading and the information transmitted may give a false indication of the trailer status.

The present inventions seeks to ameliorate the above problems and reduce the number of vehicle condition spurious signals transmitted by a tracking unit.

STATEMENT OF INVENTION

According to the present invention there is provided a tracking unit signal filter having at least one signal input for receiving a respective signal indicative of a respective vehicle parameter and processor means operable to pass a parameter signal after predetermined time delay if said signal is stable, and which is also operable to maintain said stable signal if the signal is interrupted for less than a predetermined time interval.

The term "tracking unit" applies to both active systems and passive logging systems as discussed above.

The predetermined time delay and or the time interval may be varied as is required for the particular parameter being sensed by storing numeric constants in a programmable memory device.

Preferably, for a tractor/trailer combination the signal input comprises a voltage signal from the vehicle power supply which indicates when the tractor and trailer are coupled.

Additionally or alternatively, the filter receives signals from vehicle mounted sensors which each detect the status of particular vehicle conditions, preferably trailer door status sensors.

Both the filter and tracking unit are powered by a dedicated battery, which is recharged from the vehicle power supply through a DC-DC converter. The regulated re-charging voltage applied to the battery is controlled by a microprocessor to provide a first higher charging voltage and a second lower charging voltage. Such a device is disclosed in U.S. Pat. Nos. 4,843,299 and 5,049,804.

In a preferred arrangement the DC-DC converter may be incorporated into the filter, or vice versa The filter may also include a pulse generator for modifying stable signals into a pulse, and a sequencer for putting pulse signals into a sequence according to a predetermined order of priority as stored in a programmable memory device.

A filter of the above type may be integrally incorporated into a tracking unit.

DESCRIPTION OF DRAWINGS

The invention will be described by way of example and with reference to the accompanying drawings in which.

DETAILED DESCRIPTION OF THE INVENTION

Figure 1:
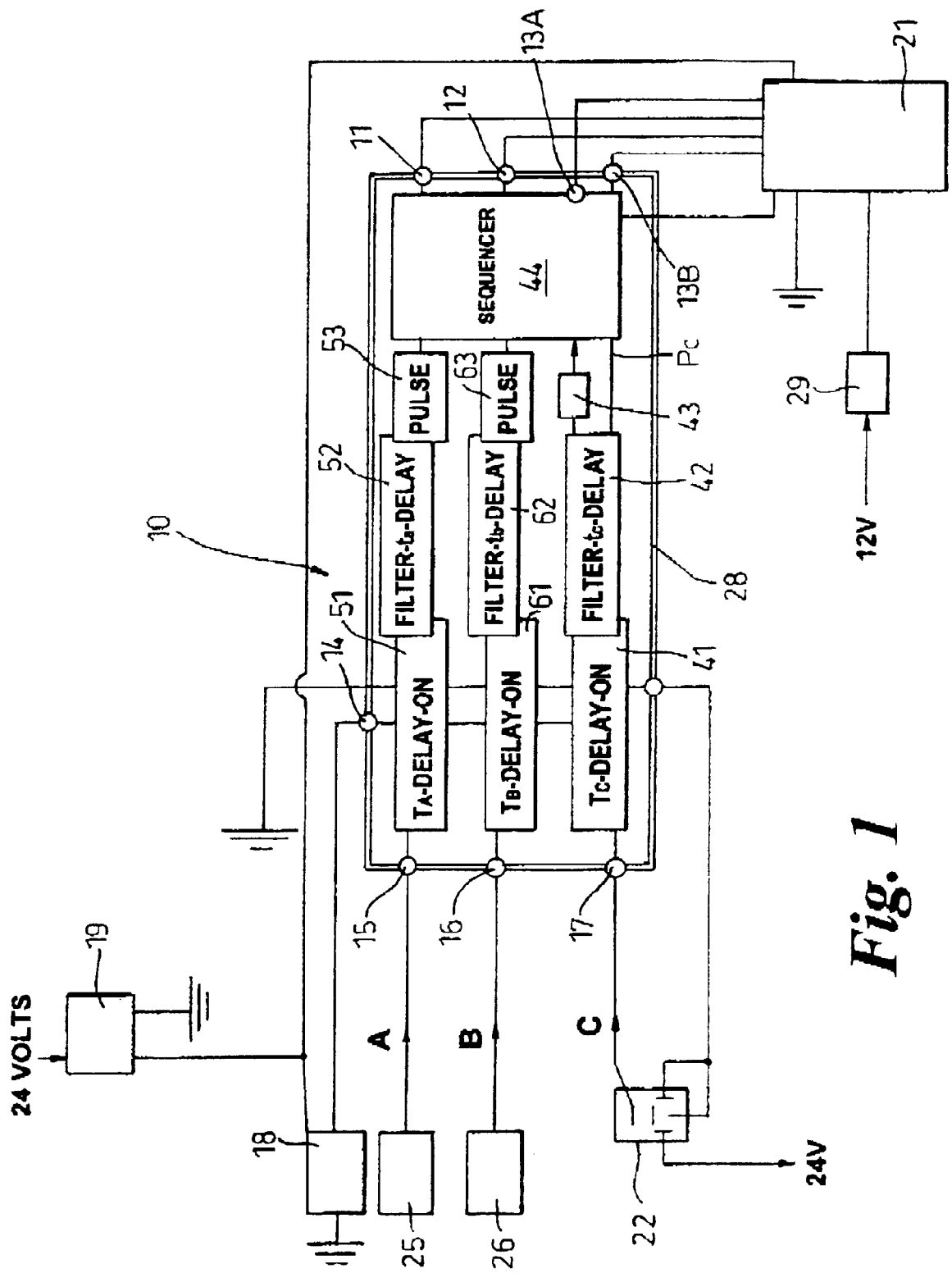
FIG. 1 is a schematic layout of the signal filter according to the present invention.

With reference to FIG. 1 there is shown schematically a signal filter 10 according to the present invention for use with a vehicle trailer tracking unit 21. A typical tracking unit is MH Fleet Plus manufactured by proTime GmbH of Prien am Chiemsee, Germany. The electrical system of the vehicle trailer is typically powered from the tractor unit through electrical couplings.

The filter 10 has outputs 11, 12, 13A & 13B, connected to a tracking unit 21 and has signal inputs 15–17. The filter 10 is also connected to a power source 18 such as a 12v dc battery 18, via input 14, for example a Yuasa NP7-12 available from Yuasa Batteries Ltd. The battery 18 may be connected to DC-DC converter 19 which receives a 24v DC current from the vehicle tractor unit. The converter 19 produces an approximate voltage of 14.5 volt DC for charging for the battery 18. An example of such a converter is an Exegon "Vepax" (tradename) 24v–12v manufactured by Exegon of Melksham, England and described in U.S. Pat. Nos. 4,843,299 and 5,049,804. The tracking unit 21 receives its operational power from the battery 18 or DC-DC converter 19.

The input 17 is connected to a relay or transistor switch type sensor 22 allowing the filter unit to sense the 24v signal from the tractor unit. The input 15 is connected to a "door open" output 25 of at least one door condition sensor and the input 16 is connected to a "door closed" output 26 of the door condition sensor. The door sensor is for example heavy duty reed proximity switches or magnetic proximity switches with changeover contacts.

The filter 10 includes a microprocessor 28, preferably a programmable processor, which monitors the signals C, A, & B respectively, received from the sensors 22, 25, 26 and processes the signals according to set instructions.

Figure 3A:
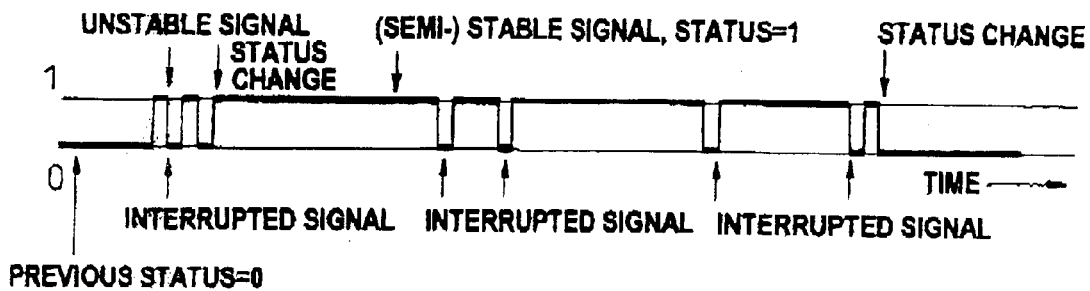
FIG. 3 shows signals before and after passing through the filter.

With also to FIG. 3, in FIG. 3A, there is shown a typical raw signal from a sensor. The signal may include an initial unstable signal and once stabilised may include interruptions due to operational problems.

Figure 3B:
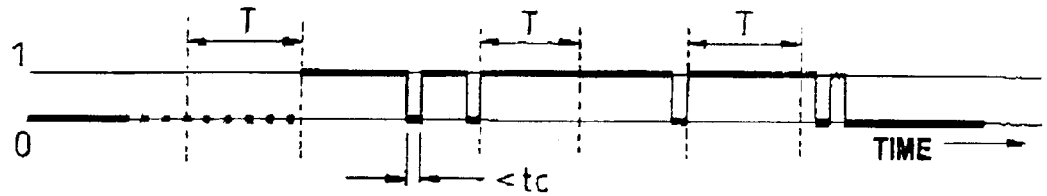
Figure 3C:
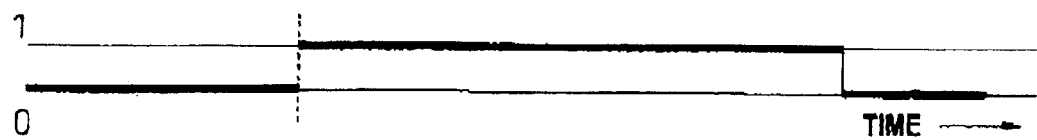
Figure 3D:
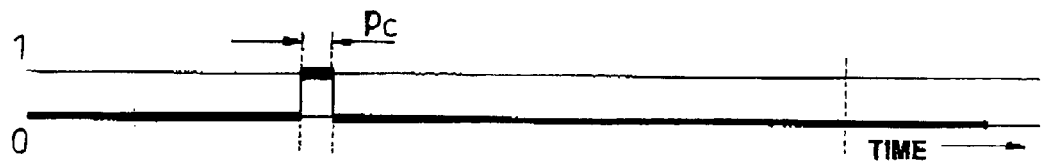

The processing of the signals from each sensor Is similar in each case. The 24v signal C indicating a trailer coupled/uncoupled status is processed as follows:
a) The 24v signal C from sensor 22 is detected and switched off by a time delay 41. After a pre-set time period TC the delay 41 switches on and the stable signal C passes through to an interrupt filter 42. The time period T may be varied as is required by storing numeric constants in the processor 28. This is represented by FIG. 3B
b) The interrupt filter 42 maintains the signal C if there is an interruption of less than a pre-set period tc in the signal C detected by the sensor 22. This pre-set period of interruption may be varied as is required by storing numeric constants in the processor 28.
c) The treated signal from the interrupt-filter 42 shown in FIG. 3C is then passed either
   i) directly into a sequencer 44 before passing through to the tracking unit 21 via a transistor switching assembly 29 and output 13B, and will keep the tracking unit 21 in active mode as long as signal C remains on, or
   ii) is passed into a pulse generator 43 which modifies an established signal into a pulse, the time period Pc of which may be varied, which is passed into the sequencer 44. The pulsed signal is shown in FIG. 3D. The pulse may be used to put the tracking unit 21 to "sleep mode". The pulsed signal Pc is passed to the unit 21 via output 13A. The sequencer 44 prevents simultaneous occurrence of inputs to the tracking unit 21 as this could result in malfunctioning of the unit, for example the generation of false status or confusing messages, or loss of status information.

The signals A and B from the doors sensor outputs 25 26 respectively are similarly processed through respective delays 51,61, interrupt filters 52,62, and pulse generators 53,63. The door status signals from the interrupt filters 52,62 may be passed into a pulse generator 53 or 63 to modify the signal as previously discussed to reset the tracking device to "sleep mode" after an initial "wake-up" when the doors are either open or closed for a prolonged time period. The door status signals are then passed into the sequencer 44 and through to the tracking device via outputs 11 & 12.

It has been found for this typical example using a semi-trailer tractor combination, that suitable a time delay for sensing vehicle coupling or uncoupling is 100 secs with an interruption period of 10 second, whereas the door status signals should have a delay period of 3 secs with an interruption period also of 3 seconds. Typical tolerances are ±0.5 secs to ±10% of the nominal value.

These periods can be varied to suit the operation conditions and sensor type.

The microprocessor may also include an inhibit instruction that prevents a transmission of a signal to the tracking unit within a given time period of an earlier transmission.

Figure 2:
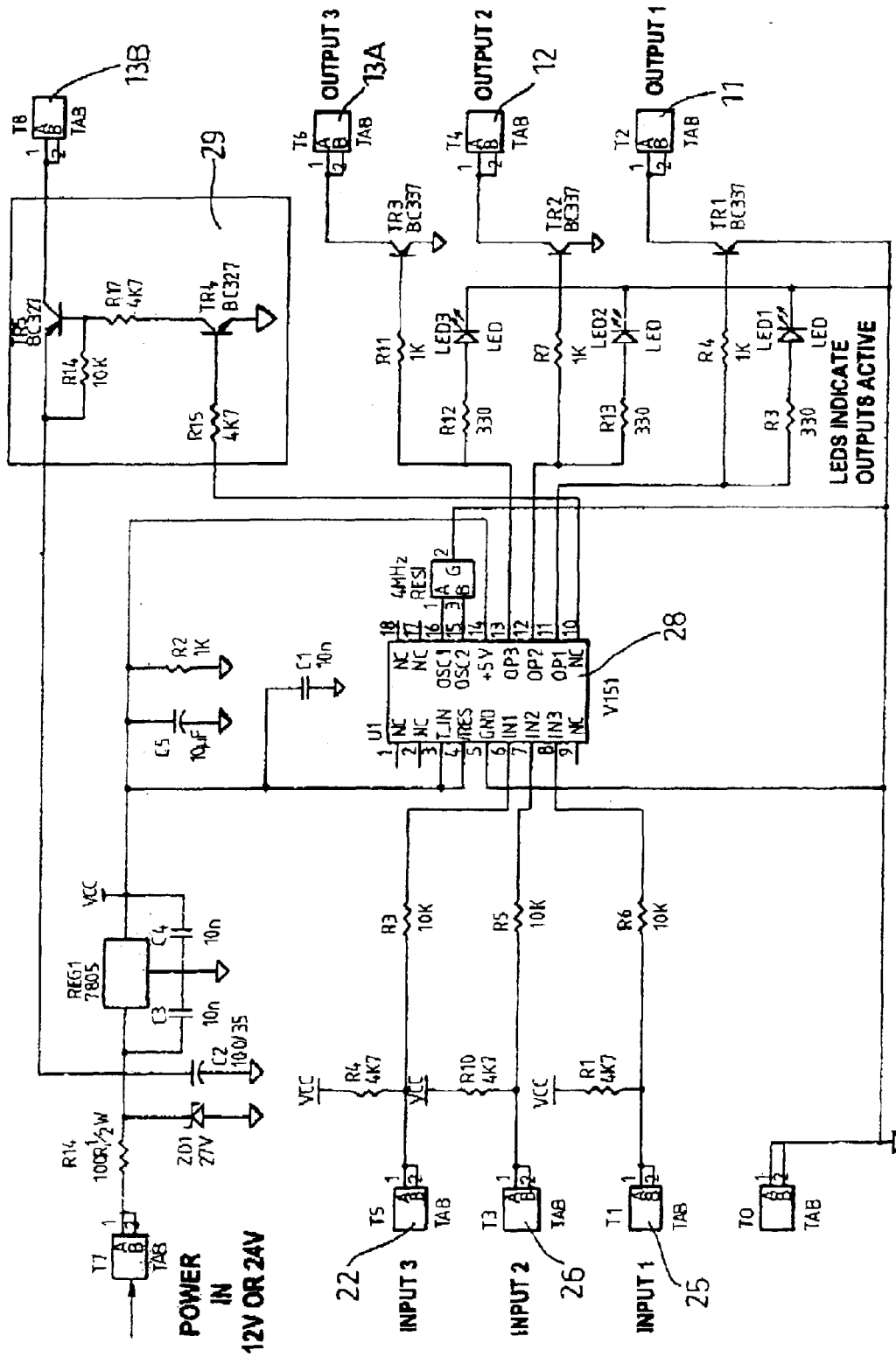
FIG. 2 is a circuit diagram of a filter according to FIG. 1.

A circuit diagram for the filter is shown in FIG. 2 and those parts corresponding with the schematic have been assigned the same reference numerals.

It will be apparent that other sensors for other vehicle parameters can be added alternatively or additionally to the filter 10, and that the microprocessor 28 can incorporate any number of "delay:interrupt filter:pulse generator" chains as is required for the number of vehicle parameters to be sensed and when necessary more than one microprocessor 28 can be used.

What is claimed is:

1. A signal filter for a global positioned tracking unit which also transmits data relating to at least one vehicle operational parameter, the filter having at least one voltage signal input for receiving a respective signal indicative of a respective vehicle parameter and processor means operable to pass a parameter signal after a predetermined time delay if said signal is stable, and which is also operable to maintain said stable signal if the signal is interrupted for less that a predetermined time interval, thereby blocking erroneous parameter signals from the tracking unit.

2. A filter as claimed in claim 1 wherein said input comprises a first voltage signal from the vehicle power supply.

3. A filter as claimed in claim 1, wherein the filter receives signals from vehicle mounted sensors which each detect the status of particular vehicle conditions.

4. A filter as claimed in claim 1, wherein when both the filter and tracking unit are powered by a dedicated battery which is recharged from the vehicle power supply by a DC-DC convertor.

5. A filter as claimed in claim 1 wherein said predetermined time delay(s) are varied as required.

6. A filter as claimed in claim 1 wherein said predetermined time interval(s) are altered as is required.

7. A filter as claimed in claim 1, and further including at least one pulse generator for modifying a stable signal into a pulse.

8. A filter as claimed in claim 7, and further including a sequencer to arrange pulsed signals in to sequential order according to a predetermined order of priority.

9. A filter as claimed in claim 4 wherein the DC-DC converter is integral with the filter.

10. A vehicle tracking and tracing unit including a signal filter as claimed in claim 9 formed integrally therewith.

11. A tracking unit signal filter according to claim 2 for use with a tractor/trailer combination wherein the filter unit receives at least one further signal from a trailer door sensor which indicates trailer door status.

* * * * *

Disclaimer and Dedication

6,882,907 B2 — Rudolf A. Bure, Banbury (GB) and Philip Hutchings, Calne (GB). TRACKING UNIT SIGNAL FILTER. Patent dated April 19, 2005. Disclaimer filed June 6, 2014, by the assignee, MTP Consultancy Limited.

Hereby disclaims and dedicates to the public the entire term or any terminal part of the term of said patent.

*(Official Gazette, July 22, 2014)*